April 30, 1968 F. J. VOCCI ET AL 3,380,499
PULSATING TISSUE-HOMOGENIZER
Filed May 5, 1966
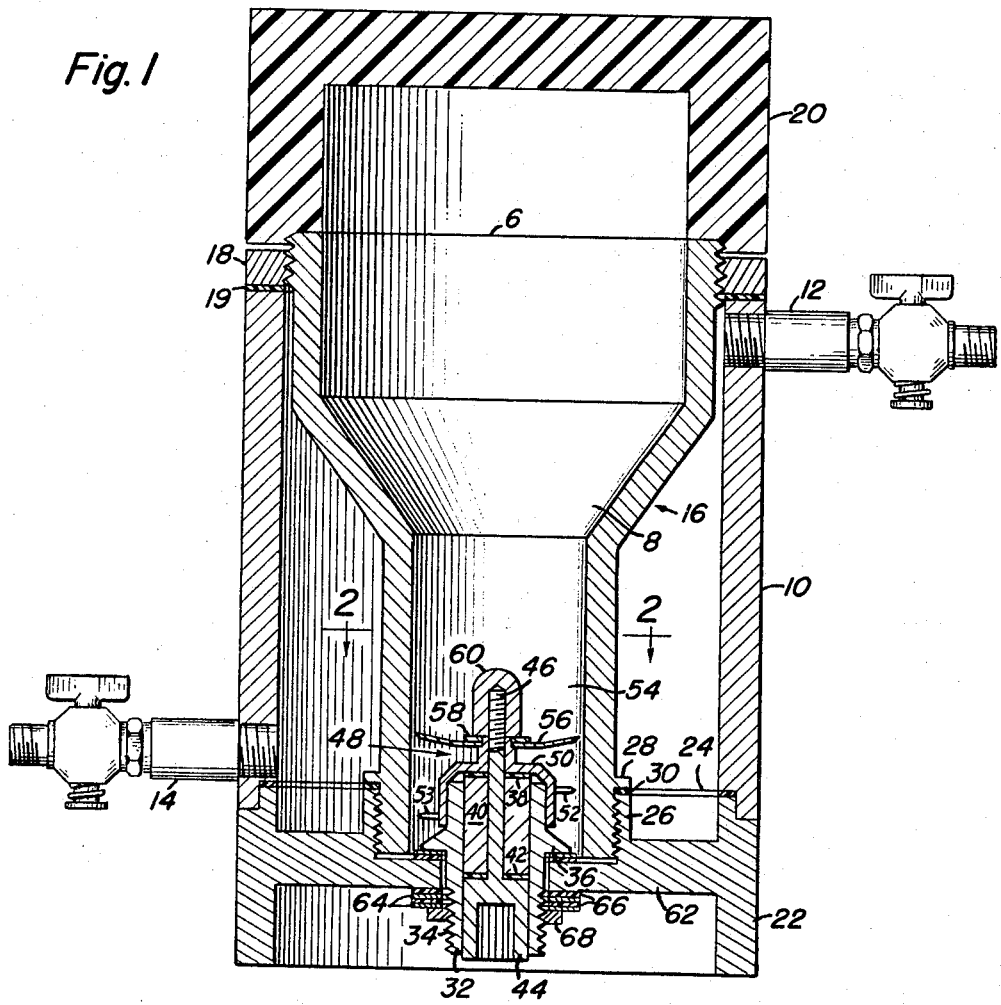
Fig. 1
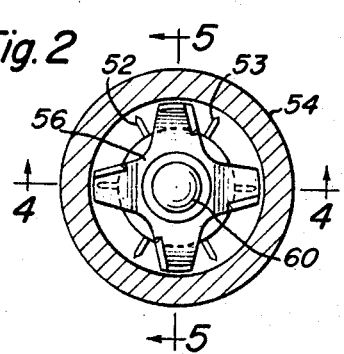
Fig. 2
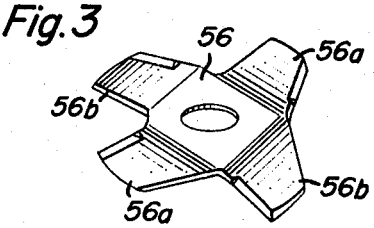
Fig. 3
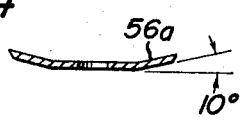
Fig. 4
Fig. 5
INVENTORS
Frank J. Vocci
Milton E. Wirth
BY Harry M. Saragovitz
Edward J. Kelly, Herbert Berl
& Benjamin G. Colley
ATTORNEYS

United States Patent Office 3,380,499
Patented Apr. 30, 1968

3,380,499
PULSATING TISSUE-HOMOGENIZER
Frank J. Vocci and Milton E. Wirth, Baltimore County, Md., assignors to the United States of America as represented by the Secretary of the Army
Filed May 5, 1966, Ser. No. 548,366
6 Claims. (Cl. 146—68)

ABSTRACT OF THE DISCLOSURE

This invention relates to a pulsating tissue-homogenizer having an upright container; generally cylindrical cooling sleeve; means for forming a liquid tight joint between the sleeve, upright container, and the container base portion; and a power driving means wherein the improvement comprises providing said homogenizer with a shearing mechanism having a hub with staggered shearing pins extending radially from the hub; said hub mounted on the drive shaft connected to the power driving means.

---

The invention relates to pulsating tissue-homogenizers which are thoroughly effective in mixing, blending, macerating, and disintegrating of tenacious animal tissue generally used in the preparation of biological and chemical studies.

The devices conveniently used in industry, in kitchens and bars for preparing mixtures and emulsions and for whipping preparations to a froth consist substantially of a mixing vessel and a mechanical stirring device rotating at a certain speed.

An object of the invention is to provide a pulsating tissue homogenizer which utilizes the principle of pulsation or oscillation or rhythmical modulation having a high amplitude during the shearing and cutting process, to minimize pin and blade contact time, and which spreads the blended and disintegrated tissue on the walls of the homogenizer for maximum heat exchange.

An object of this invention is to prevent the binding of ligamentoid or tough tissue around the shearing units.

A further object of this invention is to substitute a pulsatory action for a vortical type motion.

The prior art designs do not place the blades or shearing units in a mixing chamber which is a perfect cylinder. Usually, four lobes are present in the cylindrical body and these may be analogous to an expansion chamber which allows liquid to cycle in a vortical type motion. The effects of this are that ligamentoid or tough tissue will usually wrap around the blade and cutting action or the homogenization process stops. The tissue must be removed from the blades to start the process again.

Our invention completely circumvents the problem. The cutting blades of our homogenizer are set in a perfect cylinder at an angle from 2° to 30° from the horizontal plane, for instance with one blade being inclined upwardly with respect to the horizontal and the adjacent blade being inclined downwardly with respect to the horizontal wherein the opposite blades are deviated in the same direction. The preferred embodiment is to have each pair of opposite blades inclined 10° from the horizontal plane and rotating at a speed of approximately 10,000 r.p.m. The outer blade edges are approximately 1/32" away from the inner cylinder wall and together with the four blades, the hub with its shearing pins and the perfect lower cylinder produce a pulsating, oscillating, or rhythmical modulation motion rather than a vortical action at all normal speeds from 5,000 to 15,000 r.p.m.

The net effect is that some small fraction of the total liquid homogenate (15–25 ml.) is in contact with the blade at any moment during the up pulse. On the down pulse, the total mass returns to the area of the blade assembly but for a moment which depends on rotational speed. With concomitant cutting and shearing action during this moment, the total mass rises again (up pulse) and cleans the blade and hub assembly. The shearing pins are equidistant from each other on the cylindrical hub and ligamentous tissue is shredded into fine strands, enters the cutting cycle, is further shreaded on the down pulse by cross sectional cutting, until the process is completed. Since tough tissue (pigskin) can be homogenized in the unit, soft tissue including brain, lung, intestine, liver, and even heart, comparatively speaking, is homogenized and disintegrated with relative ease. A whole rat heart at 10,000 r.p.m. for example is completely homogenized from 15 ml. of physiological solution in two minutes. Animal brain homogenized in this manner gives enzymatic activities of brain cholinesterase identical with those performed by more laborious and manual techniques such as the Potter Blender.

This invention is designed primarily for preparing skin homogenates; it can replace other techniques for different tissues, even to the extent of recovering enzymatic activity. Rabbit liver homogenized by this technique yielded the RBC's (red blood corpuscles) contained in the organ (vessels) without any apparent hemolysis, at speeds of 5,000 r.p.m. Since the average diameter of the rabbit (RBC) is about 7.0 microns, this is probably near the size where no further homogenization takes place at this speed.

The means by which the foregoing and other objects are accomplished and the method of their accomplishment will be readily understood, reference being had to the accompanying drawing.

In the accompanying drawing:

FIG. 1 is a sectional elevation of our pulsating tissue homogenizer.

FIG. 2 is a cross sectional view taken on line 2—2.

FIG. 3 is a perspective top view of the shearing blade unit having opposing blades deviated from the horizontal.

FIG. 4 is a cross sectional view taken on line 4—4 inclined upwardly from the horizontal.

FIG. 5 is a cross sectional view taken on line 5—5 inclined downwardly from the horizontal.

The homogenizer body itself, which generally is constructed of metal is indicated by the numeral 16 and is secured to the base 22. The homogenizer body 16 consists of an upper cylinder 6 and a perfect lower cylinder or stirring chamber 54 at the lower end thereof. The lower cylinder 54 is smaller in diameter than the upper cylinder 6; therefore, an inverted frusto conical portion 8 joins the upper cylinder 6 to the lower cylinder 54. A cylindrical cooling jacket 10 having located near the upper end, water outlet orifice 12 and located on the opposite side of cooling jacket 10 near the lower end an inlet orifice 14, is adapted to fit the homogenizer body 16 at the upper cylinder 6 by means of an interior threaded retaining ring 18 and a Teflon washer 19. The upper cylinder 6, also having sufficient amount of threads to permit the threading and tightly closing of Plexiglas cover 20. The opposite end of the cooling jacket 10 is tightly assembled to motor base 22 and the homogenizer body 16 through means of a Teflon washer 24, interior threaded base flange 26, flange 28 and Teflon washer 30.

Centrally located, the motor base 22 and the interior lower portion of the homogenizer body 16 contains bearing housing 32, the latter having at the lower end threads 34 and at the midpoint flange 36. The bearing housing 32 embodies an upper rubber washer 38, bearing 40, lower rubber washer 42 and a chuck 44 with vertical drive shaft 46.

The shearing mechanism shown generally at 48 consists of a hub assembly 50 and a shearing blade unit 56. The hub assembly 50 has six radially extending, staggered pointed shearing pins 52 and 53. Three pins 52 are mounted on an upper plane of the hub 50 and are arranged 120° apart. Three pins 53 are likewise mounted on the lower plane of the hub 50 but are staggered with respect to the pins 52. In other words, the upper and lower sets of pins are 60° out of phase as is illustrated in FIG. 2. The hub assembly is mounted over the upper end of the bearing housing 32 on the vertical drive shaft 46 and each of the pins 52 and 53 are in a plane generally parallel to the bottom of the lower cylinder portion 54. The shearing blade unit 56 is adapted to fit over the hub assembly 50 and has four blades as shown in FIG. 3. The opposite pair of blades 56a form an inclined angle upwardly from the horizontal and the other opposite pair of blades 56b form an inclined angle downwardly from the horizontal. The shearing blade unit 56 is locked in place with washer 58 and retaining nut 60. The bearing housing 32 is fastened to the floor support 62 of the motor base 22, through means of retaining metal washers 64, rubber retaining washers 66 and a hexagonal lock nut 68.

The unit, being assembled and having the lower cylinder portion of the tissue homogenizer filled with the desired tissue samples, is tightly closed with the Plexiglas cover. A cover is required since the amplitude of the pulsatory action tosses the sample high into the air and the cover prevents the sample from being spilled from the homogenizer. Water is introduced to the cooling jacket and let out through the outlet valve located at the upper opposite end of said cooling jacket. The constant flow of the water through said jacket is maintained so that it can afford maximum cooling of the homogenizer body. Being in readiness, the whole unit is mounted on to a motor shaft where it engages said motor shaft through means of the chuck 44 of the vertical drive shaft. Upon switching the motor on, said drive shaft, holding rigidly the hub containing the staggered pins and the shearing blade unit, begins to rotate at a rate of speed of 10,000 r.p.m., thus shearing, shredding and cutting the tenacious tissue samples contained in the lower cylinder portion, which is also known as the stirring chamber of the pulsating tissue homogenizer. In the use of this device, after a single pulse (pulsation being due to the combination of the lower cylinder portion of the homogenizer, the deviation of the blades of the shearing blade unit in a direction away from the horizontal, the hub assembly, the distance separating the outer blade edges from the lower cylinder innerwall and the r.p.m.) the material spreads on the interior walls of the homogenizer body (which is made up of an upper and lower cylinder joined together by means of an inverted frusto conical portion) allowing maximum surface area contact with the wall of the homogenizer for maximum heat exchange. In operation, whole tissue samples are macerated and disintegrated by the shearing pins so that shearing, shredding and cutting are simultaneously involved. No pre-treatment of the tissue sample is required. However, when working with skin samples, dicing of the skin into small squares is very helpful. The Plexiglas cover or any transparent cover of the unit serves for viewing purposes so that the operator can approximate the termination of the process. The cover also functions as a baffle for the liquid-tissue return to the homogenizer body especially when the equipment is first turned on. If the cover were absent from the apparatus during its first surge, a majority of the material would be ejected completely from within the homogenizer body. The unit is completely leak proof thus allowing complete recovery of the tissue samples.

While we have shown and described a particular construction, combination, and arrangement of parts and portions and a certain modification thereof, we do not wish to be limited to this particular construction, combination, and arrangement, nor to the modification, but desire to include in the scope of our invention the construction, combination, and arrangement substantially as set forth in the appended claims.

Having thus described our invention, what we claim as new and desire to secure by Letters Patent is:

We claim:

1. In a pulsating tissue-homogenizer having, an upright container having an upper cylindrical portion and a lower cylinder portion of reduced dimension transversely of the axis of said upper portion wherein said cylinders are joined together by an inverted frusto conical portion, said lower portion defining the stirring chamber, an inverted dish-like base portion formed with an upper annular central portion and a lower laterally extending container supporting rim, the lower end of said lower cylinder portion being fixed to said central portion of said base portion, a generally cylindrical cooling sleeve positioned about said upright container and concentrically disposed with respect to said axis of said container, said sleeve having its upper end disposed against said container adjacent the lower end of said upper cylinder and having its lower end bearing against said base portion and disposed about said center portion thereof, means for forming a liquid tight joint between said sleeve, said upright container and said base portion, said sleeve and said means forming annular liquid receiving chamber means for immersing said lower portion of said container in a liquid, inlet and outlet conduit means carried by said sleeve and communicating directly with said chamber means, cover means, said cover means being effective to hermetically seal said upright container, power driving means, a vertical, axially rotatable drive shaft connected to said power driving means, said drive shaft journalled in said central portion of said base portion and extending into said lower cylinder portion, the improvement which comprises providing said homogenizer with a shearing mechanism consisting of a hub having staggered shearing pins extending radially from said hub, each pin being in a plane generally parallel to the bottom of said lower cylinder portion, said hub being mounted on said drive shaft operating near the bottom of said lower cylinder portion and a shearing blade unit having four opposed blades, said blades being deviated with respect to the horizontal and disposed above said hub and cooperating therewith, wherein said shearing mechanism rotates at a speed of 5000 to 15,000 r.p.m. producing a rhythmically, modulating action therein.

2. Apparatus as claimed in claim 1 wherein one pair of opposite blades of said shearing blade unit are inclined approximately 10° upwardly with respect to the horizontal and the other opposite pair of blades are inclined approximately 10° downwardly with respect to the horizontal.

3. Apparatus as claimed in claim 2 wherein the outer blade edges of said shearing blade unit are spaced approximately 1/32" from the inner wall of said lower cylinder.

4. Apparatus as claimed in claim 3 wherein said hub shearing pins are spaced approximately 1/32" from the innerwall of said lower cylinder and are six in number.

5. Apparatus as claimed in claim 4 wherein said shearing mechanism rotates at a speed of approximately 10,000 r.p.m.

6. Apparatus as claimed in claim 4 in which said hub has a first set of three equiangularly spaced shearing pins in one plane and a second set of three equiangular spaced pins in a second plane which is spaced a predetermined distance from said first plane.

References Cited

UNITED STATES PATENTS 2,240,213  4/1941  Fromm _____ 146—192

JAMES M. MEISTER, *Primary Examiner.*